United States Patent
Tsukizaki et al.

(10) Patent No.: US 9,593,767 B2
(45) Date of Patent: Mar. 14, 2017

(54) SHIFT CONTROL DEVICE FOR ELECTRICALLY DRIVEN VEHICLE

(71) Applicant: Nissan Motor Co., Ltd., Kanagawa (JP)

(72) Inventors: Atsushi Tsukizaki, Kanagawa (JP); Ryohey Toyota, Kanagawa (JP); Toshifumi Hibi, Kanagawa (JP); Yutaka Kaneko, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/768,511

(22) PCT Filed: Dec. 27, 2013

(86) PCT No.: PCT/JP2013/085094
§ 371 (c)(1),
(2) Date: Aug. 18, 2015

(87) PCT Pub. No.: WO2014/136365
PCT Pub. Date: Sep. 12, 2014

(65) Prior Publication Data
US 2015/0377346 A1    Dec. 31, 2015

(30) Foreign Application Priority Data

Mar. 7, 2013    (JP) .................................. 2013-044988

(51) Int. Cl.
*F16H 61/02* (2006.01)
*B60L 15/20* (2006.01)
(Continued)

(52) U.S. Cl.
CPC .......... *F16H 61/0213* (2013.01); *B60L 15/20* (2013.01); *B60W 10/10* (2013.01);
(Continued)

(58) Field of Classification Search
None
See application file for complete search history.

(56) References Cited

U.S. PATENT DOCUMENTS 5,035,157 A * 7/1991 Aoki ................... F16H 61/0213
477/128
2005/0209046 A1* 9/2005 Potter ................. F16H 61/0213
477/115
(Continued)

FOREIGN PATENT DOCUMENTS

JP    2010-202124 A    9/2010

*Primary Examiner* — Edwin A Young
(74) *Attorney, Agent, or Firm* — Osha Liang LLP (57) ABSTRACT

A shift control device for an electrically driven vehicle, which is installed in the electrically driven vehicle including a motor as a drive source and an automatic transmission coupled to an output shaft of the motor, has a shift controller that performs shifting of the automatic transmission using a previously set shift line. The shift controller has, as the shift line, an electricity consumption prioritized shift line with priority placed to improve electricity consumption rate, and a driving force prioritized shift line with priority placed to suppress the frequency of shifting. The driving force prioritized shift line is used for a predetermined time after completion of the shift control using the electricity consumption prioritized shift line.

10 Claims, 8 Drawing Sheets

(51) Int. Cl.
*F16H 61/10* (2006.01)
*B60W 10/10* (2012.01)
(52) U.S. Cl.
CPC .......... *F16H 61/10* (2013.01); *B60L 2240/12* (2013.01); *B60L 2240/421* (2013.01); *B60L 2240/423* (2013.01); *B60L 2240/486* (2013.01); *B60L 2270/145* (2013.01); *F16H 2061/022* (2013.01); *F16H 2061/0227* (2013.01); *Y02T 10/645* (2013.01); *Y02T 10/72* (2013.01); *Y02T 10/7275* (2013.01)

(56) References Cited

U.S. PATENT DOCUMENTS

2007/0056784 A1\* 3/2007 Joe ........................... B60K 6/48
  180/65.245
2012/0150400 A1\* 6/2012 Swartling ........... F16H 61/0213
  701/55

\* cited by examiner

SHIFT CONTROL DEVICE FOR ELECTRICALLY DRIVEN VEHICLE

CROSS-REFERENCE TO RELATED APPLICATIONS

The present application is a national stage application of PCT/JP2013/085094 filed Dec. 27, 2013, which claims priority to Japanese Patent Application No. 2013-44988, filed with the Japan Patent Office on Mar. 7, 2013, the disclosure of which are incorporated herein by reference in their entirety.

BACKGROUND

Technical Field

The present invention relates to a shift control device for an electrically driven vehicle installed in the electrically driven vehicle having a motor and an automatic transmission for performing a shift control of the automatic transmission using a shift line.

Related Art

Conventionally, a shift control device for an electrically driven vehicle is known in which a shift control is carried out using a previously prepared shift line (shift map) and an operating point determined by the required driving force and the vehicle speed (for example, see Patent Document 1).

Patent Document 1: JP Patent Application Publication No. 2010-202124 A

SUMMARY

Incidentally, in the conventional shift control device in an electrically driven vehicle, the shift control is carried out once the operating point crosses the shift line. Here, in order to avoid busy shifting from being repeated in a short time, an upshift line and a downshift line are provided with a hysteresis therebetween. Thus, when an operating point present on the Low side crosses the upshift line to move to the High side, an upshift control is performed. On the other hand, the operating point in the High side crosses the downshift line to move to the Low side, the downshift is performed.

However, in order to improve the electricity consumption rate (power efficiency) of the motor, it is necessary to locate the upshift line and the downshift line in a position close to the optimal electric power efficiency line. Thus, it is difficult to secure a sufficient hysteresis between the upshift line and a downshift line. Therefore, incomplete prevention of busy shifting may occur.

A shift control device for an electrically driven vehicle according to one or more embodiments of the present invention may suppress the occurrence of the busy shifting.

A shift control device for an electrically driven vehicle according to one or more embodiments of the present invention is installed in the electrically driven vehicle including a motor as a drive source and an automatic transmission coupled to an output shaft of the motor and the shift control device is provided with a shift controller to perform shifting of the automatic transmission using a previously set shift line.

Further, the shift controller includes, as the shift line, an electricity consumption preference or prioritized shift line with priority placed to improve electricity consumption rate and a driving force preference or prioritized shift line with priority placed to suppress the frequency of shifting. Further, the shift controller is configured to use the driving force prioritized shift line for a predetermined time after completion of the shift control using the electricity consumption prioritized shift line.

According to one or more embodiments of the present invention, by the shift controller, after a shift control using the electricity consumption prioritized shift line has been completed, a shift control using a driving force prioritized shift line will be performed for a predetermined time, which is set with priority placed on suppression of shifting frequency. Thus, it is possible to suppress occurrence of busy shifting which would occur when using the electricity consumption prioritized shift line.

Further, in a case, in order to prevent busy shifting, the shift control per se is prohibited for a predetermined time, Moreover, in order to avoid such a busy shift, in case of prohibiting the execution of the shift control itself for a predetermined time after completion of the shifting control, risk of insufficient driving force is predicted when the required driving force becomes high.

However, by allowing execution of the shift control using the driving force preference shift line, it is possible to prevent the driving force from being insufficient.

DETAILED DESCRIPTION

Below, a description is given of embodiments of the present invention with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, description is made of the configuration. The configuration of a shift control device mounted in an electric vehicle (an example of an electrically driven vehicle) in one or more embodiments of the present invention is described in "the overall system configuration", "detailed configuration of a shift control system" and "transmission control processing configuration", separately.

[Overall System Configuration]

Figure 1:
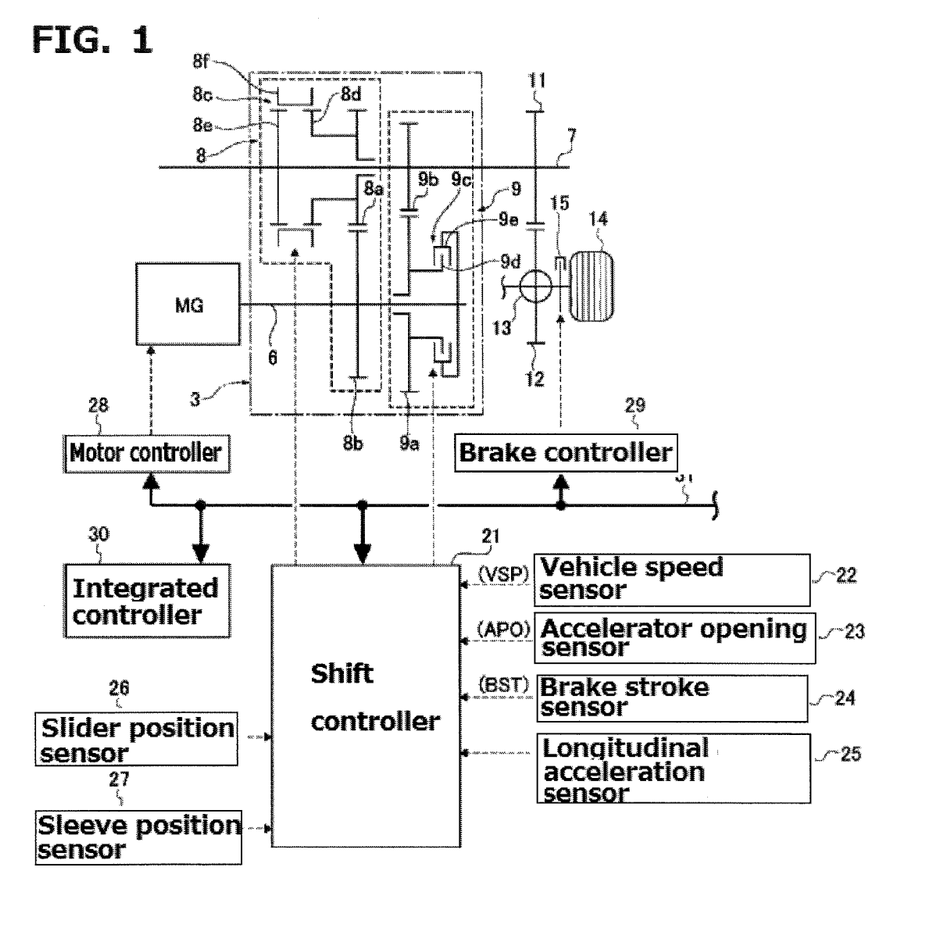
FIG. 1 is an overall system block diagram showing a driving system configuration and a control system configuration of an electric vehicle (an example of an electrically driven vehicle) to which the shift control device of one or more embodiments of the present invention is applied.

FIG. 1 shows a driving system configuration and a control system configuration of an electric vehicle to which the shift control device in one or more embodiments of the present invention is applied. Below, with reference to FIG. 1, the overall system configuration is described.

As the driving system configuration of the electric vehicle, as shown in FIG. 1, a motor generator MG, an automatic transmission 3, a drive wheel 14 are provided.

The motor generator MG is used as a motor serving as a driving source during the power running time, and is used as a generator for regeneration. A motor shaft (output shaft) is connected to a transmission input shaft 6 of an automatic transmission 3.

The automatic transmission 3 is a constant mesh-type stepped transmission which transmits power in one of two gear pairs of different transmission or speed ratios, in which two stage shifting are performed in which a high gear stage (high speed stage) with a low speed reduction ratio and a low gear stage with high speed reduction ratio. The automatic transmission 3 is configured by a low side transmission mechanism 8 for realizing a low speed stage and a high side transmission mechanism 9 for realizing a high speed stage. Note that the transmission input shaft 6 and the transmission output shaft 7 are disposed parallel to each other.

The low-speed side transmission mechanism 8 is used for selecting a low-side transmission path and is disposed on the transmission output shaft 7. The low-side transmission mechanism 8 is made up of by an engagement clutch 8c (meshing clutch) which performs a meshing engagement/release of a gear 8a with respect to the transmission output shaft 7 in order for the low speed stage gear pair (gear 8a, gear 8b) to drivingly connect between the transmission input shaft 6 and the output shaft 7. Here, the low speed stage gear pair is composed of the gear 8a rotatably supported on the transmission output shaft 7 and the gear 8b which is meshed with the gear 8a and rotates jointly with the transmission input shaft 6.

The high-side transmission mechanism 9 is intended for selecting a high-side transmission path and is arranged on the transmission input shaft 6. This high-speed side transmission mechanism 9 is made up of by a friction clutch 9c which performs a frictional engagement/release of a gear 9a with respect to the transmission input shaft 6 in order for the high speed stage gear pair (gear 9a, gear 9b) to drivingly connect between the transmission input shaft 6 and the output shaft 7. Here, the high speed stage gear pair is composed of the gear 9a rotatably supported on the transmission input shaft 6 and the gear 9b which is meshed with the gear 9a and rotates jointly with the transmission output shaft 7.

The transmission output shaft 7, with a gear 11 fixed thereto, and through a final drive gear set composed of the gear 11 and a gear 12 mashed therewith, is configured to drivingly connect the differential gear unit 13 to the transmission output shaft 7. Thus, the motor power of the motor generator MG which has reached the transmission output shaft 7 is configured to be transmitted to the left and right driving wheels 14 (only one of the drive wheels is shown in FIG. 1) via the final drive gear set 11, 12 and the differential gear unit 13.

As the control system configuration of the electric vehicle, as shown in FIG. 1, a shift controller 21, a vehicle speed sensor 22, an accelerator opening sensor 23, a brake stroke sensor 24, a longitudinal acceleration sensor 25, a slider position sensor 26, a sleeve position sensor 27, and the like are provided. In addition, a motor controller 28, a brake controller 29, an integrated controller 30, and a CAN communication line 31 are provided.

The shift controller 21, when upshifting to the high-speed gear stage in the low gear stage with the engagement clutch 8c in engaged state and the friction clutch 9c released, performs a switching control to release the engagement clutch 8c and to frictionally connect the friction clutch 9c. Also, when down-shifting to low gear stage in a state in which the engagement clutch 8c is released and the friction clutch 9c is frictionally connected, the shift controller 21 performs a switching control to carry out meshing engagement of the engagement clutch 8c and release of the friction clutch 9c. In other words, in the up-shift, the engagement clutch 8c of a dog or meshing clutch becomes a released element, while, in the downshift, the engagement clutch 8c of the dog clutch becomes the connecting element.

[Detailed configuration of the speed control system]

Figure 2:
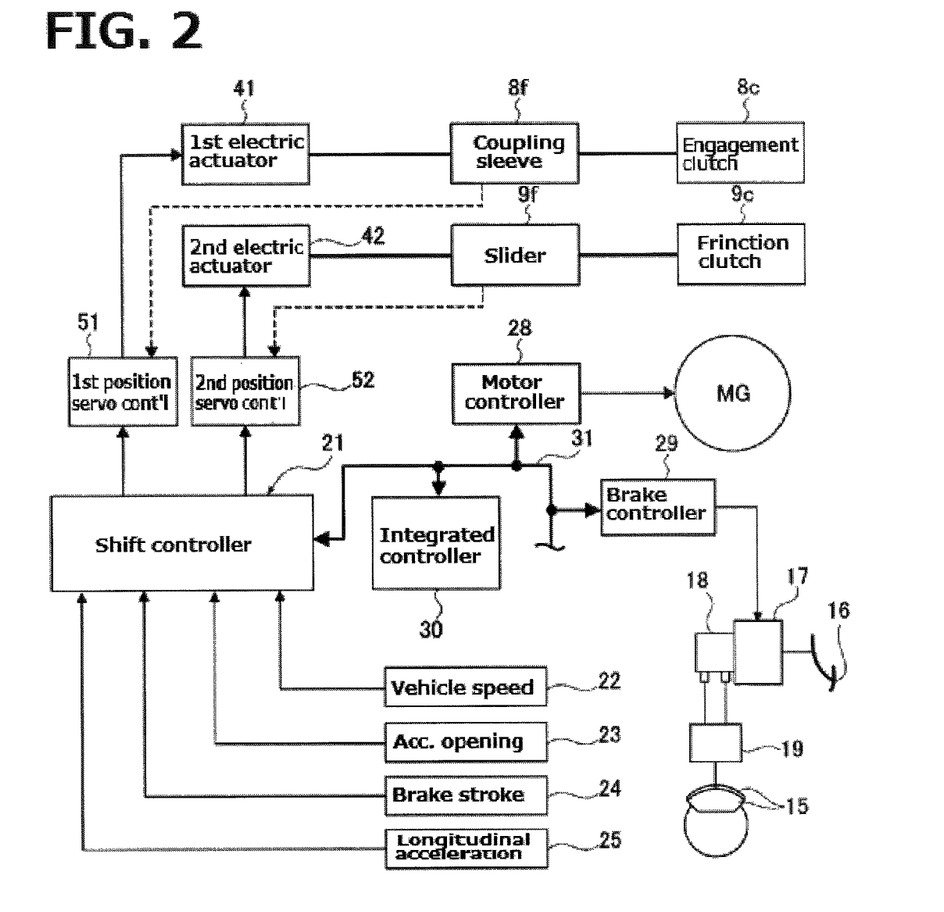
FIG. 2 is a control block diagram showing a detailed configuration of a shift control system of one or more embodiments of the present invention.

FIG. 2 shows a detailed configuration of a shift control system of one or more embodiments of the present invention. Below, with reference to FIG. 2, a detailed configuration of the shift control system is described.

As a configuration of the shift control system of the control system of the electric vehicle, as shown in FIG. 2, an engagement clutch 8c, a friction clutch 9c, a motor generator MG, a hydraulic brake 15, a shift controller 21, and an integrated controller 30 are provided. Specifically, the engagement clutch 8c and the friction clutch 9c are configured to perform a shift control based on a command from the shift controller 21.

The motor generator MG and the hydraulic brake 15 is configured to perform a regenerative cooperative brake control in accordance with a command from the integrated controller 30.

The engagement clutch 8c is a clutch of meshing engagement, synchronous type, and includes a clutch gear 8d provided on the gear 8a and a clutch hub 8e attached to the transmission output shaft 7, and a coupling sleeve 8f (See FIG. 1). Further, by driving in stroke the coupling sleeve 8f by a first electric actuator 41, meshing engagement/release is performed. The meshing engagement and the release of the engagement clutch 8c is determined by the position of the coupling sleeve 8f. The shift controller 21 reads the value of the sleeve position sensor 27 and is provided with a first position servo controller 51 (for example, position servo system with PID control) which provides a current to the first electric actuator 41, so that the sleeve position is located in the meshing engagement position or the release position.

Further, when the coupling sleeve 8f is in meshed engagement position shown in FIG. 1, where the coupling sleeve 8f is meshed with the outer periphery clutch teeth of both clutch gear 8d and the clutch hub 8e, the gear 8a is drivingly connected to the transmission output shaft 7. On the other hand, when the coupling sleeve 8f is in a non-meshing position (released position) with the outer periphery clutch teeth of one of the clutch gear 8d and the clutch hub 8e, the gear 8a is released from the transmission output shaft 7.

The friction clutch 9c includes a driven plate 9d which rotates together with the gear 9a, and a drive plate 9e which rotates together with the transmission input shaft 6, (see FIG. 1). Further, by driving a slider 9f to impart a pressing force to both plates 9d, 9e by the electric actuator 42, the frictional engagement/release is performed.

The transmission torque capacity of the frictional clutch 9c is determined by a position of the slider 9f. Also, the slider 9f is a screw mechanism, so that, when the input of the second electric actuator 42 is 0 (zero), the position is configured to be held. The shift controller 21 reads the value of the slider position sensor 26 and is provided with a second position servo controller 52 (for example, position servo system by PID control) so that a slider position for obtaining a desired transmission torque capacity may be achieved.

Further, the friction clutch 9c rotates jointly with the transmission input shaft 6, and drivingly connects the gear 9a to the transmission input shaft 6 when frictionally engaging and, when releasing, separates the drive connection between the gear 9a and the transmission input shaft 6, The motor generator MG is controlled in a driving or regenerative mode by the motor controller 28 which receives a command output from the integrated controller 30. In other words, when the motor controller 28 receives a motor torque command, the motor-generator MG is in a drive mode. On the other hand, when the motor controller 28 receives a regenerative torque command, the motor generator MG is put in regenerative control.

The hydraulic brake 15 gives a hydraulic braking force to the drive wheels 14 by the brake fluid being supplied via a brake pedal 16→the electric booster 17→master cylinder 18→brake fluid of the pressure actuator 19. The hydraulic brake 15, during regenerative cooperative brake control, in response to the brake controller 29 inputting a brake fluid pressure command, controls the brake fluid pressure by outputting a drive command corresponding to a share of the hydraulic braking force to the electric booster 17. Here, the regenerative cooperative brake control is intended to describe the control in which the required braking force is calculated on the basis of the brake stroke amount BST from a brake stroke sensor 24 (or the required deceleration), and the calculated braking force is achieved by sharing the regenerative braking force and the hydraulic braking force. Basically, in order to increase the electricity consumption performance, the regenerative braking force is determined based on the maximum regenerative torque available at that time, and the remainder obtained by subtracting the regenerative braking force from the required braking force is borne by the hydraulic braking force.

Figure 3:
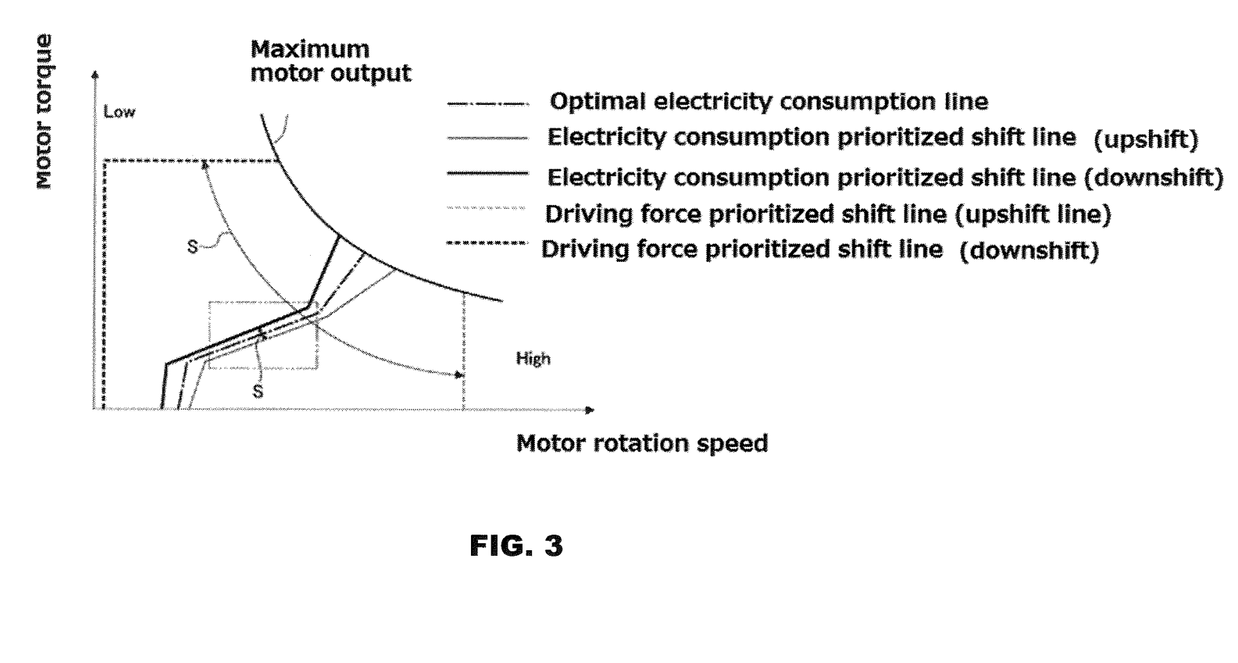
FIG. 3 is a shift map diagram showing an example of a shift line of an automatic transmission used in a shift controller in one or more embodiments of the present invention.

The shift controller 21 receives the information from the vehicle speed sensor 22, accelerator opening sensor 23, a brake stroke sensor 24, and a longitudinal acceleration sensor 25, etc., and controls the upshift and downshift of the automatic transmission 3 by using a shift map showing a shift line (FIG. 3).

Here, the shift line consists of an upshift line and a downshift line respectively set across the optimal electricity consumption line set. Further, the shift controller 21 is configured to perform shift control, after completion of the shift control using the electricity consumption prioritized shift line, using the driving force prioritized shift line for a predetermined time. Moreover, the shift controller 21 is configured, when the driver requested driving force is equal to a threshold value or less after the predetermined time, shift control using the driving force prioritized shift line is switched over to the shift control using the electricity consumption prioritized shift line.

Note that the required driving force of the driver is estimated based on the accelerator opening APO. That is, the accelerator opening APO has a proportional relationship to the driver's required driving force. Thus, the required driving force is regarded as being equal to the accelerator opening APO.

Here, the "optimum electricity consumption line" represents a characteristic line indicating the relationship between the motor speed and the motor torque at which the electricity consumption rate of the motor generator MG (hereinafter referred to as "electricity consumption") is in the best state, as shown by a dashed line in FIG. 3. The term "upshift line" is a line which partitions the Low side and the High side in the shift map and shown by a thin line in FIG. 3. When the operating point on the shift map identified by the motor rotation speed and the motor torque passes across the upshift line from the Low-side to the High-side, upshifting is performed. Further, the "downshift line" is a line which partitions the Low side and the High side in the shift map and shown by a thick line in FIG. 3. When the operating point on the shift map identified by the motor rotation speed and the motor torque passes across the upshift line from the High-side to the Low-side, downshifting is performed.

Moreover, between the "downshift line" and the "upshift line", a hysteresis S is provided to avoid busy shift from being repeated in a short time.

Further, the "electricity consumption prioritized shift line" is set with priority place on improvement in electricity consumption at the motor generator MG, and is shown by a solid line. The electricity consumption prioritized shill line is set in the vicinity of the optimal electricity consumption line where the hysteresis S between the downshift line and the upshift line is relatively small.

Furthermore, the "driving force prioritized shift line" is a line provided with priority The driving preference shift line is set to a position away from the optimum electricity consumption line, and the hysteresis S between the downshift line and the upshift line is set wider than the electricity consumption prioritized line. Note that the "suppression of the shift frequency" is intended to prevent the shift control from being frequent, and to suppress the driving force discontinuation accompanied by execution of the shift control.

[Shift control processing configuration]

Figure 4:
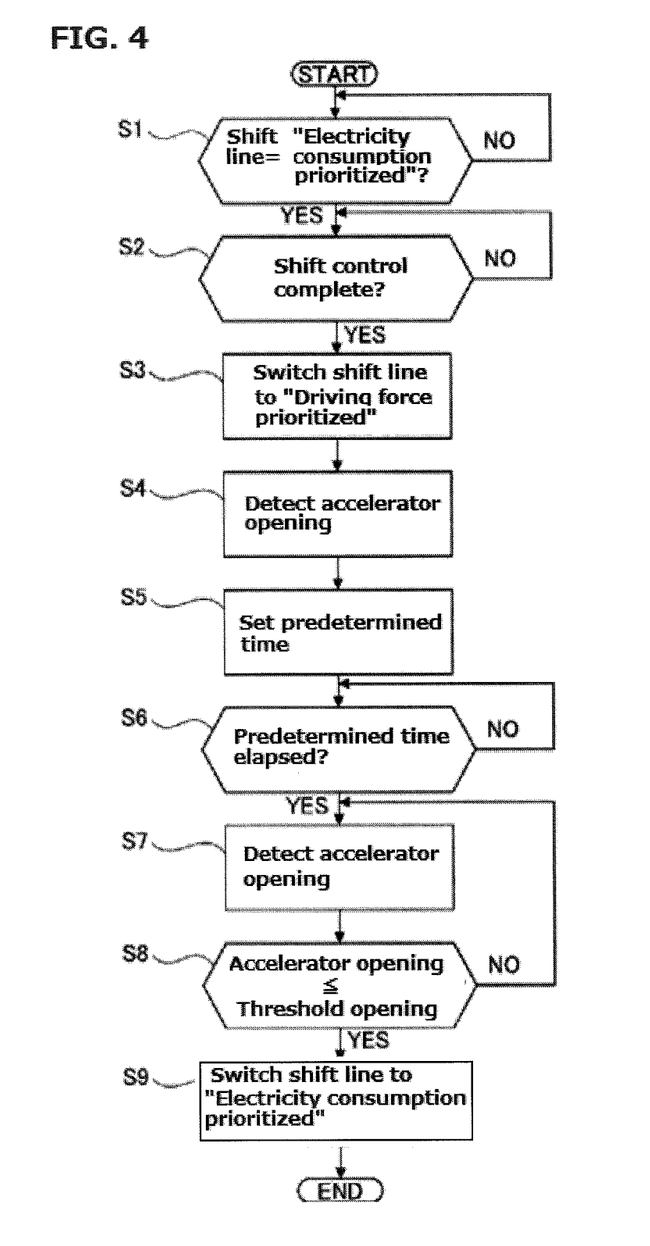
FIG. 4 is a flowchart showing a flow of a shift control process executed by the shift controller in one or more embodiments of the present invention.

FIG. 4 shows a flow of a shift control process executed by the shift controller in one or more embodiments of the present invention. Below, based on FIG. 4, a description is given of each step representing a shift control processing configuration of one or more embodiments of the present invention.

In step S1, it is determined whether or not the shift line of the shift map used for shift control of the automatic transmission 3 in the shift controller 21 is "electricity consumption prioritized shift line." If YES (shift line=electricity consumption prioritized), the process advances to step S2. If NO (shift line=driving force prioritized), control repeats step S1.

In step S2, following the determination that the shift line=electricity prioritized in step S1, while executing the shift control applying the electricity consumption prioritized shift line at the same time, it is determined whether or not this shift control is complete If YES (shift complete), control proceeds to step S3. If NO (shift incomplete), control repeats step S2.

In step S3, following the determination that shift control in step S2 is complete, the shift line of the shift map used in the shift control in the shift controller 21 is switched to the "driving force prioritized shift line", and control proceeds to step S4. Thus, when performing the shift control again, the driving force prioritized shift line indicated by broken line in the shift map of FIG. 3 is applied.

In step S4, following the switching setting of the shift line in step S3, the current accelerator opening APO is read, and the process proceeds to step S5. Here, the accelerator opening APO is detected by the accelerator opening sensor 23.

In step S5, following the reading of the accelerator opening in step S4, according to the identified accelerator opening APO, after the completion of the shift control using the "electricity consumption prioritized shift line", a predetermined time in which the shift line is being switched in the "driving force prioritized shift line" is set, and control proceeds to step S6.

Figure 5:
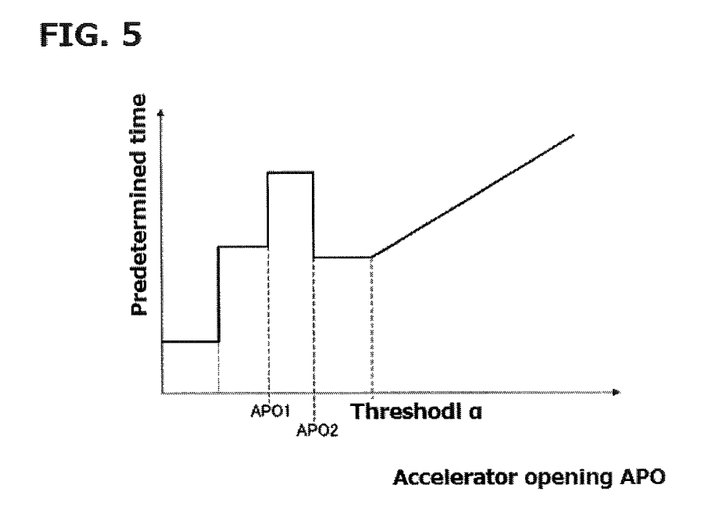
FIG. 5 is a map showing a relationship between the required driving force of one or more embodiments of the present invention and the transmission shift line switching time.

Here, the setting of the "predetermined time (shift line switching time)" is performed based on the time setting map shown in FIG. 5. That is, when the accelerator opening APO indicating a required driving force of the driver is smaller than a threshold value $\alpha$ set in advance, depending on the magnitude of the accelerator opening APO, a plurality of areas of the accelerator opening APO is separated and a fixed time is set for each area. Also, when the accelerator opening APO is greater than the threshold value $\alpha$ set in advance, the predetermined time is set to be increased as the accelerator opening APO increases.

It should be noted that the "predetermined time" represents the time for the accelerator operation by the driver to stabilize, i.e. the time for the variations or fluctuations of the accelerator to converge. The fluctuation convergence time of the accelerator is short when the accelerator opening APO is relatively small (with a small amount of depression) while being long when the accelerator opening APO is relatively large (with a large amount of depression). Therefore, when the accelerator opening APO is greater than the threshold value $\alpha$, the predetermined time is set longer in accordance with increased accelerator opening APO. On the other hand, in the electricity consumption prioritized shift line, when the motor torque is medium, i.e., when the accelerator opening APO is less than the threshold value $\alpha$, and larger than the minimum depression area of almost no depression, the hysteresis between the upshift line and the downshift line will be the smallest (region surrounded by a two-dot chain lines in FIG. 3). Therefore, when the accelerator opening APO is smaller than the threshold value $\alpha$, according to the size of hysteresis S between the upshift line and downshift line in electricity consumption prioritized shift line, a plurality of areas is provided depending on the accelerator opening APO. Further, in the accelerator opening region with a larger hysteresis S, the predetermined time is set to relatively long, whereas, in the accelerator opening area with a smaller hysteresis S (the region between APO1 and APO2 of the accelerator opening APO), the predetermined time is set relatively long.

In step S6, following the setting of the predetermined time in step S5, it is determined whether or not the predetermined time has elapsed. If YES (predetermined time elapsed), the process proceeds to step S7. If NO (predetermined time unexpired), control repeats the step S6.

In step S7, following the determination of lapse of the predetermined time in step S6, the accelerator opening APO is detected again, and the process proceeds to step S8. Here, the accelerator opening APO is detected by the accelerator opening sensor 23.

At step S8, subsequent to the reading of the accelerator opening in step S7, it is determined whether or not the read accelerator opening APO is less than the threshold opening which is set in advance. If YES (accelerator opening≤threshold opening), control proceeds to step S9, whereas if NO (accelerator opening>threshold opening), process returns to step S7.

Here, the "threshold opening" may be arbitrarily set. However, the accelerator opening APO is set somewhere to a value such that, even when the shift control is performed, the shift shock may be suppressed.

In step S9, following the determination of the accelerator opening≤threshold opening at step S8, the shift line of the shift map used for shift control in the shift controller 21 is switched over to the "electricity consumption prioritized shift line", and control ends. Thus, when performing the shift control again, the electricity consumption prioritized line shown by solid line in the shift map of FIG. 3 will be applied.

Now, a description of the operation is given. First, a "shift control device in a Comparative Example" is discussed. Subsequently, the shift line switching operation in the shift control device for an electric vehicle in one or more embodiments of the present invention is described.

[Shift Control Device in a Comparative Example]

Assumption is made in which, in an electric vehicle having a driving system configuration of one or more embodiments of the present invention, the shift control of the automatic transmission 3 is carried out.

The shift control of the automatic transmission 3 is performed based on the shift map included in the shift controller 21. Here, the shift map is normally set so as to prioritize the electricity consumption. In other words, it has been assumed to have only electricity consumption prioritized or preference shift line shown in FIG. 3. Further, with respect to the electricity consumption prioritized shift line, an upshift line and a downshift line are respectively set in the vicinity of an optimal electricity consumption line so that there is a region where the hysteresis S is narrow between the two shift lines.

Therefore, in a state in which the accelerator operation is not stable and the like, the position of the operating point determined by the motor rotation speed and the motor torque is not definitive, and the upshift line and a downshift line will be repeatedly crossed over within a short period of time. Thus, there may be busy shift in which the shift control repeatedly occurs.

In order to avoid this busy shifting, for example, it is conceivable to keep wide the hysteresis S between the upshift line and the downshift line of the shift lines. However, in this case, at least one of the upshift line and the downshift line will be moved away from the optimum electricity consumption line. Therefore, electricity consumption is deteriorated.

Also, in order to avoid the busy shifting, for example, it is further conceivable to prohibit a shift control itself for a predetermined time after the shift control. However, in this case, if there is an accelerator pedal depression during the shift prohibition period, the driving force is insufficient.

[Shift Line Switching Operation]

Figure 6:
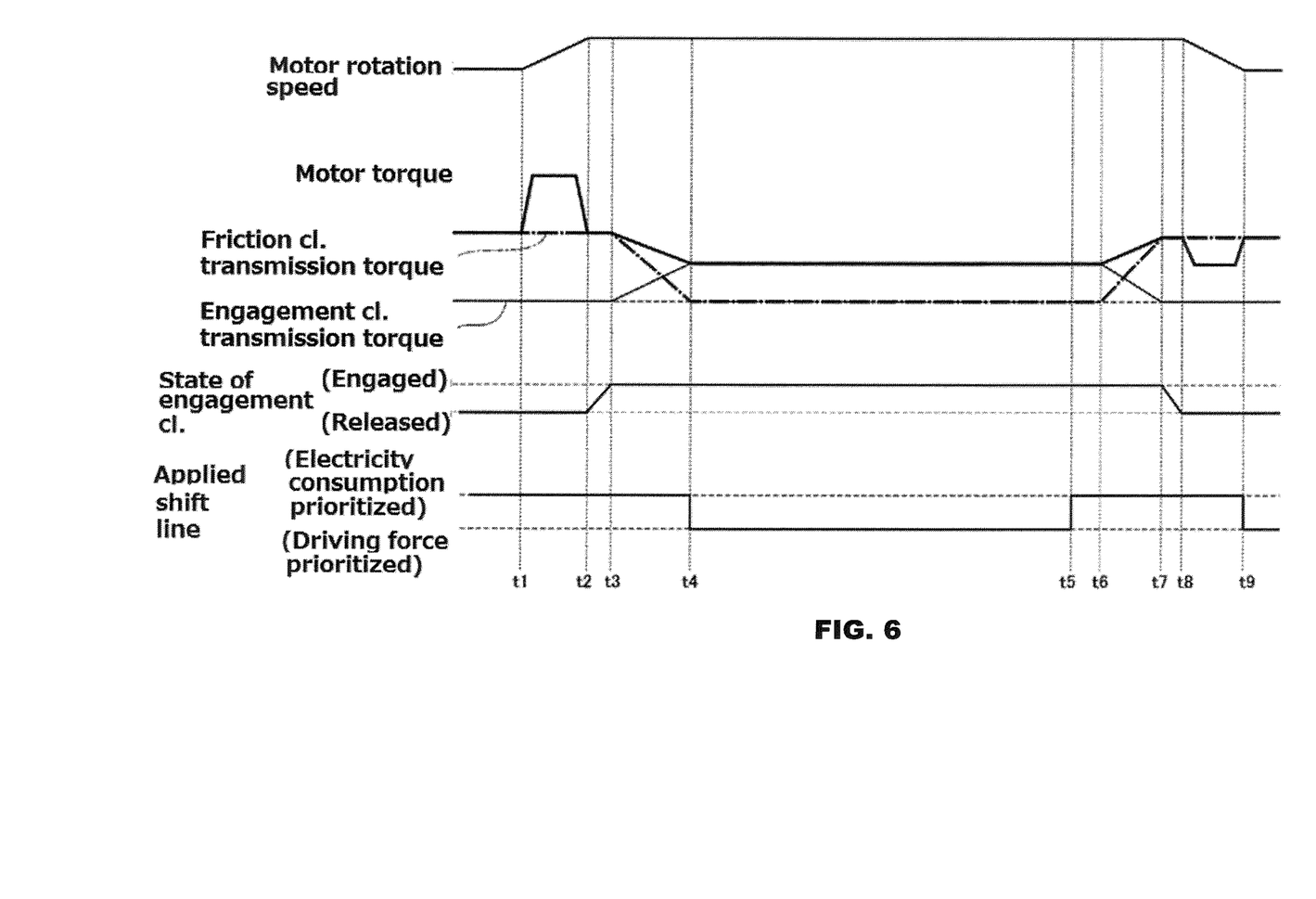
FIG. 6 is a time chart showing each characteristic of the applied shift line including a motor rotation speed, a motor torque, a transmission torque of a friction clutch, a transmission torque of an engaging clutch, and a state of the engaging clutch.

FIG. 6 is a time chart showing each of characteristics of the applied shift line in an electric vehicle in which the shift control device of one or more embodiments of the present invention is installed, which include a motor rotation speed, a motor torque, a transmission torque of a friction clutch, a transmission torque of an engaging clutch, and a state of the engaging clutch.

Below, the shift line switching operation in the shift control device of one or more embodiments of the present invention will be described with reference to FIG. 6.

In the shift controller 21, when performing a shift control by using the electricity consumption prioritized shift line (indicated by a solid line in FIG. 3), at time t1 shown in FIG. 6, if the operating point determined by the motor rotation speed and motor torque passes across the downshift line of the electricity consumption prioritized shift line from the High side to the Low side, a command of downshifting will be output from the shift controller 21. Thus, the automatic transmission 3 starts downshifting.

In other words, a switching control is performed in which the engagement clutch 8c is put in meshed engagement and the friction clutch 9 is released.

Thus, when the motor speed is increased, and if the input rotation speed of the automatic transmission 3 matches the output rotation speed at time t2, synchronization is assumed to be complete and the coupling sleeve 8f of the engagement clutch 8c is driven in a linear stroke.

Subsequently, at time t3, once the coupling sleeve 8f are meshed with both of the outer clutch teeth of the clutch gear 8d and clutch hub 8e, and gear 8a is drivingly connected to transmission output shaft 7, the meshing engagement of the engagement clutch 8c will be completed. Subsequently, the motor torque and the transmission torque of the friction clutch 9c are gradually reduced, and, at time t4 in which the transmission torque of the friction clutch 9c is reduced to zero, the shift control is completed.

Thus, in a flowchart shown in FIG. 4, control proceeds from step S1 through step S2 to step S3, the shift line used for shift control in the shift controller 21 is switched from the electricity consumption prioritized line to the driving force prioritized shift line.

Further, control proceeds to step S5 through step S4, and the accelerator opening APO at time t4 (at the time of shift change completion is introduced. Based on this accelerator opening APO and the time setting map shown in FIG. 5, the switching time of the shift line will be set.

At time t5 when the set predetermined time has elapsed, control proceeds to step S7 from step S6, and the accelerator opening at time t5 will be detected. When, the detected accelerator opening APO is equal to a threshold or less, control proceeds to step S9 from step S8, the shift line used for the shift control in the shift controller 21 is switched back again from the driving force prioritized shift line to the electricity consumption prioritized shift line.

Note that it is assumed here, during switching to the driving force prioritized shift line, that the operating point would not come across the shift line so that shifting would not take place.

Subsequently, at time t6 when the operating point crosses the electricity consumption prioritized shift line to the High side from the Low side upshift line, an upshift command is output from the shift controller. Thus, upshifting of the automatic transmission 3 is started. In other words, a switching control is performed by releasing the engagement clutch 8c and the frictional engagement of the friction clutch 9c.

Therefore, the transmission torque of the friction clutch gradually increases, and when the friction clutch transmission torque at time t7 matches the motor torque, the torque phase of the shift is assumed to be completed,. Thus, the coupling sleeve 8f of the engagement clutch 8c is driven again in stroke.

Subsequently, at time t8, when the coupling sleeve 8f comes into a non-meshing position relationship with the outer periphery teeth of either the clutch gear 8d or the clutch hub 8e, it is assumed that the engagement clutch 8c is released to reduce the motor rotation speed. At tie t9, when the motor rotation speed coincides with a target rotation speed, the shift control ends.

Consequently, in the flowchart shown in FIG. 4, control again proceeds from step S1 through step S2 to step S3, the shift line used for shift control in the shift controller 21 is set to be changed from the electricity consumption prioritized shift line to the driving force prioritized shift line again.

Figure 7:
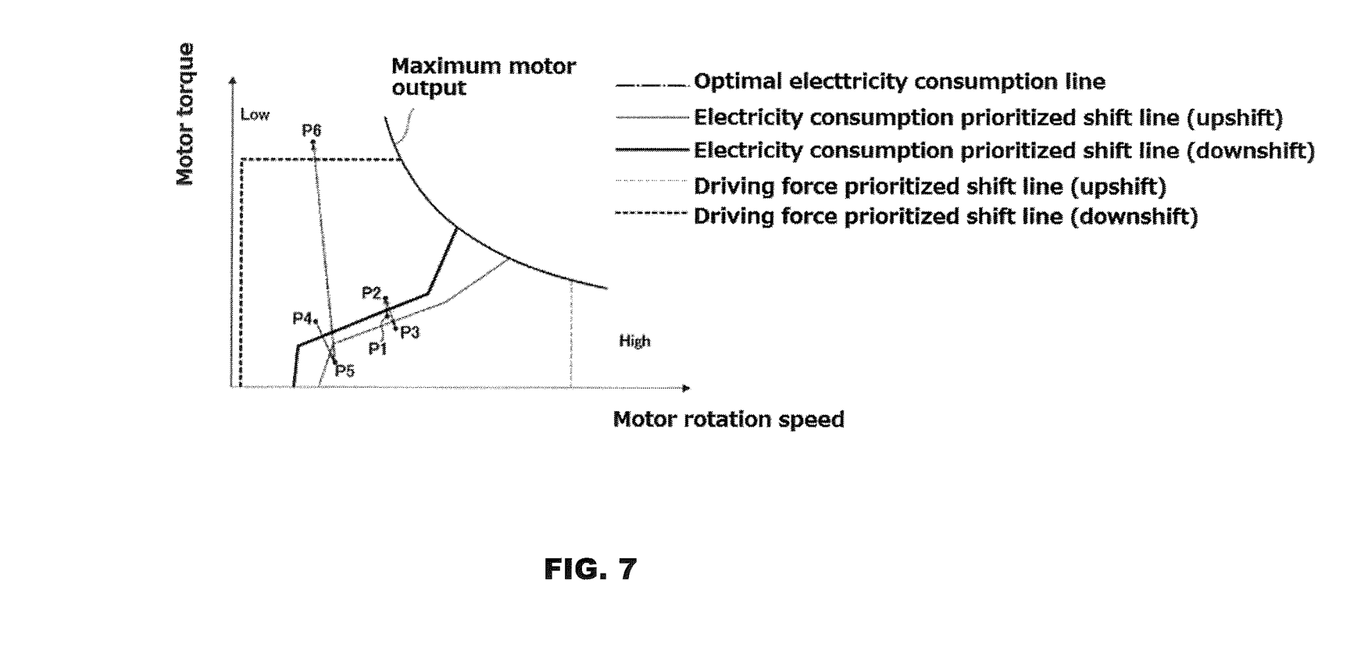
FIG. 7 is an explanatory view showing the movement of the operating point in a shift map used in the shift controller of one or more embodiments of the present invention.

Thus, in the shift control device of one or more embodiments of the present invention, after the completion of the shift control using the electricity consumption prioritized shift line, for a predetermined time, a driving force prioritized shift line will be used. Therefore, for example, as shown in FIG. 7, even when the operating point changes from P1 through P2 to P3 in a short time, by moving the operating time from P1 to P2, if the downshift control has taken place when the operating point has crossed the downshift line of the electricity consumption prioritized shift line, the shift line switches over at that time to the driving force prioritized line. Thus, even when the operating point moves from P2 to P3, due to switching-over of the shift lines, no shift control would be performed.

In other words, even when the operating point undergoes change as P1→P2→P3 in a short period of time, as in the time chart shown in FIG. 6, the low-speed stage is maintained without shifting being executed. As a result, it is possible to avoid the busy-shift in which shift control will be repeated in a short time.

Also, for example, as shown in FIG. 7, when the operating point is changed with the P4→P5→P6, at the time of upshift completion at which the operating point has moved from P4 to P5, the shift line is switched over to the driving force prioritized shift line. Further, when the accelerator pedal is depressed greatly, and the operating point moves from P5 to P6, then the operating point will pass across the downshift line of the driving force prioritized shift line. Therefore, at this time, despite switching of the shift line, downshift control is performed so that driving force shortage may be avoided.

Note that the driving force prioritized shift line is, compared to the electricity consumption prioritized shift line, set such that the hysteresis S between the downshift line and the upshift line is increased. Therefore, when control is set to use the driving force prioritized or preference shift line, rather than using the electricity consumption prioritized shift line, it is possible to reliably suppress the shift frequency.

Then, in the shift control device of one or more embodiments of the present invention, according to the accelerator opening APO, which is proportional to the required driving force of the driver, the predetermined time for switching from the electricity consumption prioritized shift line to the driving force prioritized shift line is set. Therefore, it is possible to appropriately set the "predetermined time" reserved for the time until the fluctuation or variation of the accelerator operation is converged, while preventing the deterioration of the electricity consumption costs and suppressing the occurrence of the busy shifting.

In particular, in one or more embodiments of the present invention, as shown in FIG. 5, in the low opening range of the accelerator opening APO (equal to the threshold value $\alpha$ or less), while the accelerator opening APO is divided into a plurality of regions, the predetermined time is set in accordance with a plurality of the required driving force regions. Further, in the high opening range of the accelerator opening APO (greater than the threshold α), the predetermined time is set to be longer as the accelerator opening APO increases.

Thus, according to the size of hysteresis S between the downshift line and the upshift line in the electricity consumption prioritized shift line, the predetermined time may be set appropriately. In addition, while preventing deterioration of the deterioration in the electricity consumption, it is possible to suppress the occurrence of busy shifting.

Furthermore, in one or more embodiments of the present invention, after a predetermined time has elapsed, once the accelerator opening APO has been detected again and the accelerator opening APO at that time point of lapse of the predetermined time has fallen below the threshold opening (predetermined value), the shift line used for the shift control is configured to be switched from the driving force prioritized shift line to the electricity consumption prioritized shift line.

Thus, for example, even when, accompanied by switching the shift line from the driving force prioritized shift line to the electricity consumption prioritized shift line, a case would occur in which shift control is performed immediately after switching of the shift line, when the accelerator opening APO is equal to the threshold value or less, it is possible to suppress the occurrence of shift shock.

In the shift control device for an electric vehicle of one or more embodiments of the present invention, it may be possible to obtain one or more of the following effects.

(1) In a shift control device for an electrically driven vehicle, which is installed in the electrically driven vehicle including a motor (motor generator MG) as a drive source and an automatic transmission 3 coupled to an output shaft (motor shaft) of the motor (motor generator MG), and which is provided with a shift controller 21 to perform shifting of the automatic transmission 3 using a previously set shift line, the shift controller 21 is configured to include, as the shift line, an electricity consumption preference or prioritized shift line with priority placed to improve electricity consumption rate and a driving force preference or prioritized shift line with priority placed to suppress the frequency of shifting, and wherein the driving force prioritized shift line is configured to be used for a predetermined time after completion of the shift control using the electricity consumption prioritized shift line.

Thus, it is possible to suppress occurrence of busy shifting in which shift control is repeated within a short period of time.

(2) The electricity consumption prioritized shift line is configured to be set to a shift line at which the hysteresis between the upshift line and the downshift line respectively set to sandwich the optimal electricity consumption is relatively small while the driving force prioritized shift line is configured to be set to a shift line at which the hysteresis between the upshift line and the downshift line respectively set to sandwich the optimal electricity consumption is larger than the electricity consumption prioritized shift line.

Thus, in addition to the effect of (1), when switching the shift line for shift control to the driving force prioritized shift line, compared to when using the electricity consumption prioritized shift line, it is possible to prevent the occurrence of the busy shifting reliably.

(3) The shift controller 21 is configured to set the predetermine time in accordance with the required driving force of the driver (accelerator opening APO).

Thus, in addition to the effect of (1) or (2), it is possible to appropriately set the predetermined time so that it is possible to prevent the electricity consumption from being deteriorated and to suppress the occurrence of busy shifting.

(4) The shift controller 21 is configured to divide the required driving force of the driver (accelerator opening APO) into a plurality of regions and set the predetermined time in accordance with the plurality of regions of the required driving force.

Thus, in addition to the effect of (3), it is possible to set the predetermined time more appropriately so that, while preventing deterioration in the electricity consumption, it is possible to more effectively suppress the occurrence of busy shifting.

(5) The shift controller 21 is configured to set the predetermined time longer as the required driving force (accelerator opening APO) increases.

Thus, in addition to the effect of (3), it is possible to set the predetermined time more appropriately so that, while preventing deterioration in the electricity consumption, it is possible to more effectively suppress the occurrence of busy shifting.

(6) The shift controller 21 is configure to switch the shift line used for the shift control from the driving force prioritized shift line to the electricity consumption prioritized shift line when, after lapse of the predetermined time, the required driving force (accelerator opening APO) of the driver has fallen a predetermined value (threshold opening).

Thus, in addition to any one of the effects (1) to (5), even when the shift control is performed immediately after switching of the shift line, if the accelerator opening APO is equal to the threshold opening or less, it is possible to suppress the occurrence of shift shock.

As describe above, the shift control device for an electrically driven vehicle according to embodiments of the present invention is described. The specific configuration is not limited to the above embodiments. Without departing the gist of the inventions pertaining to each claim, modification in design or addition thereof may be accepted.

In one or more embodiments of the present invention, an example of the automatic transmission is shown which has an engagement clutch 8c and a friction clutch 9c with a two speed shift stage of a high gear stage and low gear stage. However, the automatic transmission may be in a form of a stepped automatic transmission having a plurality of gear positions or shift stages. The shifting element may be configured only in the friction clutch, or only in the engagement clutch.

In one or more embodiments of the present invention, as the driver required driving force, an example of using the accelerator pedal opening APO is shown. However, as the required driving force by the driver, an accelerator opening speed (rate of change of the accelerator opening) may be used as long as a value proportional to the required driving force is available.

In one or more embodiments of the present invention, a method of setting the predetermined time for switching to the driving force prioritized shift line from the electricity consumption prioritized shift line according to the magnitude of the accelerator opening APO. However, the predetermined time setting may be made by the same method regardless of the magnitude of the accelerator opening APO. In other words, it is possible to divide the entire area of the accelerator opening APO into a plurality of regions, and to set the predetermined time for each of the plurality of the required driving force regions. Alternatively, over the entire operational area of the accelerator pedal opening APO, the predetermined time may be set longer as the accelerator opening APO increases.

In one or more embodiments of the present invention, an example is shown in which the shift map is prepared based on the motor rotation speed and the motor torque. However, the shift map may be set based on a vehicle speed VSP and the accelerator opening APO. In this case, shift control will be performed in accordance with an operating point determined by the vehicle speed VSP and the accelerator opening APO, and a shift line.

Figure 8:
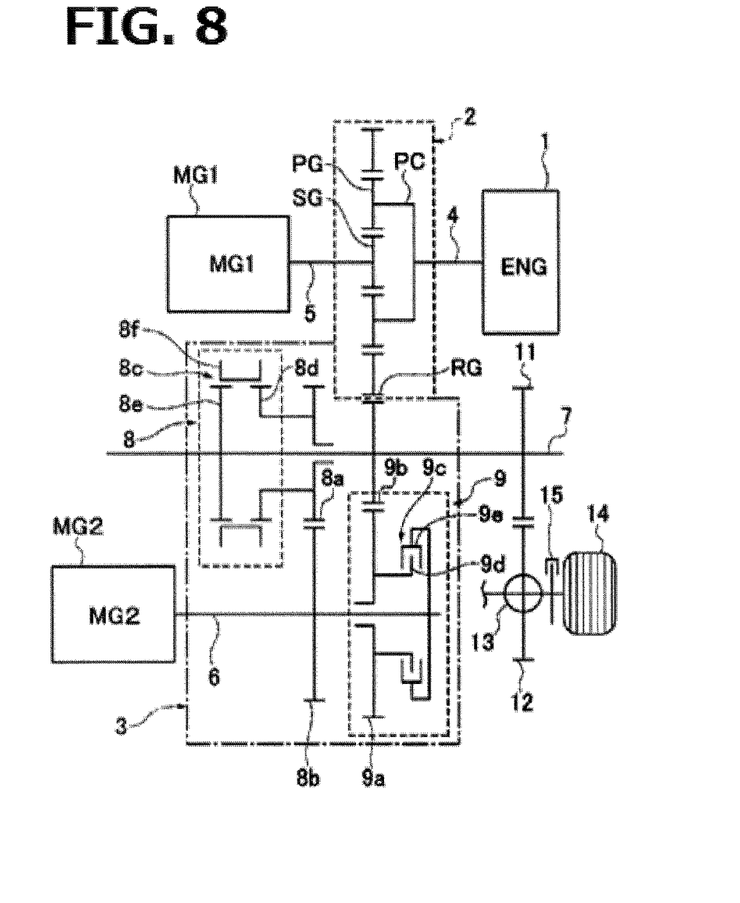
FIG. 8 is an example of the driving system configuration of a hybrid vehicle (another example of the electrically driven vehicle) to which the shift control device according to one or more embodiments of the present invention is applicable.

In one or more embodiments of the present invention, an example is shown in which the shift control device is applied to an electric vehicle including a motor generator MG as a driving source. However, the shift control device according to one or more embodiments of the present invention may be applied to a hybrid vehicle having an engine and a motor generator as driving source. For example, as a hybrid vehicle having an engine and two motor generators as driving source, as shown in FIG. 8, the driving system of one or more embodiments of the present invention may be added with an engine 1, a power generating motor generator MG1, and a driving force distribution unit 2. In the case, in a state in which the engine 1 and the power generating motor generator MG1 output zero-torque, and while the driving motor generator MG2 is a regenerative mode, when the automatic transmission 3 is to perform shifting, the shift control according to one or more embodiments of the present invention may be applicable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A shift control device for an electrically driven vehicle, which is installed in the electrically driven vehicle including a motor as a drive source and an automatic transmission coupled to an output shaft of the motor, comprising:
    a shift controller that performs shift control including shifting of the automatic transmission using a shift map having motor rotation speed as a first axis and motor torque as a second axis, the shift map comprising a previously set shift line,
    wherein the shift controller comprises, as the shift line:
        an electricity consumption prioritized shift line that prioritizes improvement of electricity consumption rate, and
        a driving force prioritized shift line that prioritizes suppression of the frequency of shifting, and
    wherein the driving force prioritized shift line is used for a predetermined time after completion of the shift control using the electricity consumption prioritized shift line.

2. The shift control device for an electrically driven vehicle as claimed in claim 1,
    wherein the electricity consumption prioritized shift line is set such that the shift map comprises a first upshift line and a first downshift line that are offset from each other by a first offset, wherein the driving force prioritized shift line is set such that the shift map comprises a second upshift line and a second downshift line that are offset from each other by a second offset, and wherein the first offset is smaller than the second offset.

3. The shift control device for an electrically driven vehicle as claimed in claim 2,
    wherein the shift controller sets the predetermined time in accordance with a required driving force of a driver.

4. The shift control device for an electrically driven vehicle as claimed in claim 3,
    wherein the shift controller divides the required driving force of the driver into a plurality of regions and set the predetermined time in accordance with the plurality of the regions.

5. The shift control device for an electrically driven vehicle as claimed in claim 4,
    wherein the shift controller switches the shift line used for the shift control from the driving force prioritized shift line to the electricity consumption prioritized shift line when, after lapse of the predetermined time, the required driving force of the driver has fallen a predetermined value.

6. The shift control device for an electrically driven vehicle as claimed in claim 3,
    wherein the shift controller sets the predetermined time longer as the required driving force increases.

7. The shift control device for an electrically driven vehicle as claimed in claim 6,
    wherein the shift controller switches the shift line used for the shift control from the driving force prioritized shift line to the electricity consumption prioritized shift line when, after lapse of the predetermined time, the required driving force of the driver has fallen a predetermined value.

8. The shift control device for an electrically driven vehicle as claimed in claim 3,
    wherein the shift controller switches the shift line used for the shift control from the driving force prioritized shift line to the electricity consumption prioritized shift line when, after lapse of the predetermined time, the required driving force of the driver has fallen a predetermined value.

9. The shift control device for an electrically driven vehicle as claimed in claim 2,
    wherein the shift controller switches the shift line used for the shift control from the driving force prioritized shift line to the electricity consumption prioritized shift line when, after lapse of the predetermined time, a required driving force of a driver has fallen a predetermined value.

10. The shift control device for an electrically driven vehicle as claimed in claim 1,
    wherein the shift controller switches the shift line used for the shift control from the driving force prioritized shift line to the electricity consumption prioritized shift line when, after lapse of the predetermined time, a required driving force of a driver has fallen a predetermined value.

* * * * *